Jan. 23, 1951 G. W. HARDY 2,539,018
HYDRAULIC STEERING MECHANISM
Filed Jan. 6, 1945 3 Sheets-Sheet 1

INVENTOR
GORDON W. HARDY
BY
ATTORNEY

Jan. 23, 1951 G. W. HARDY 2,539,018
HYDRAULIC STEERING MECHANISM
Filed Jan. 6, 1945 3 Sheets-Sheet 2

INVENTOR
GORDON W HARDY
BY
ATTORNEY

Jan. 23, 1951 G. W. HARDY 2,539,018
HYDRAULIC STEERING MECHANISM
Filed Jan. 6, 1945 3 Sheets-Sheet 3
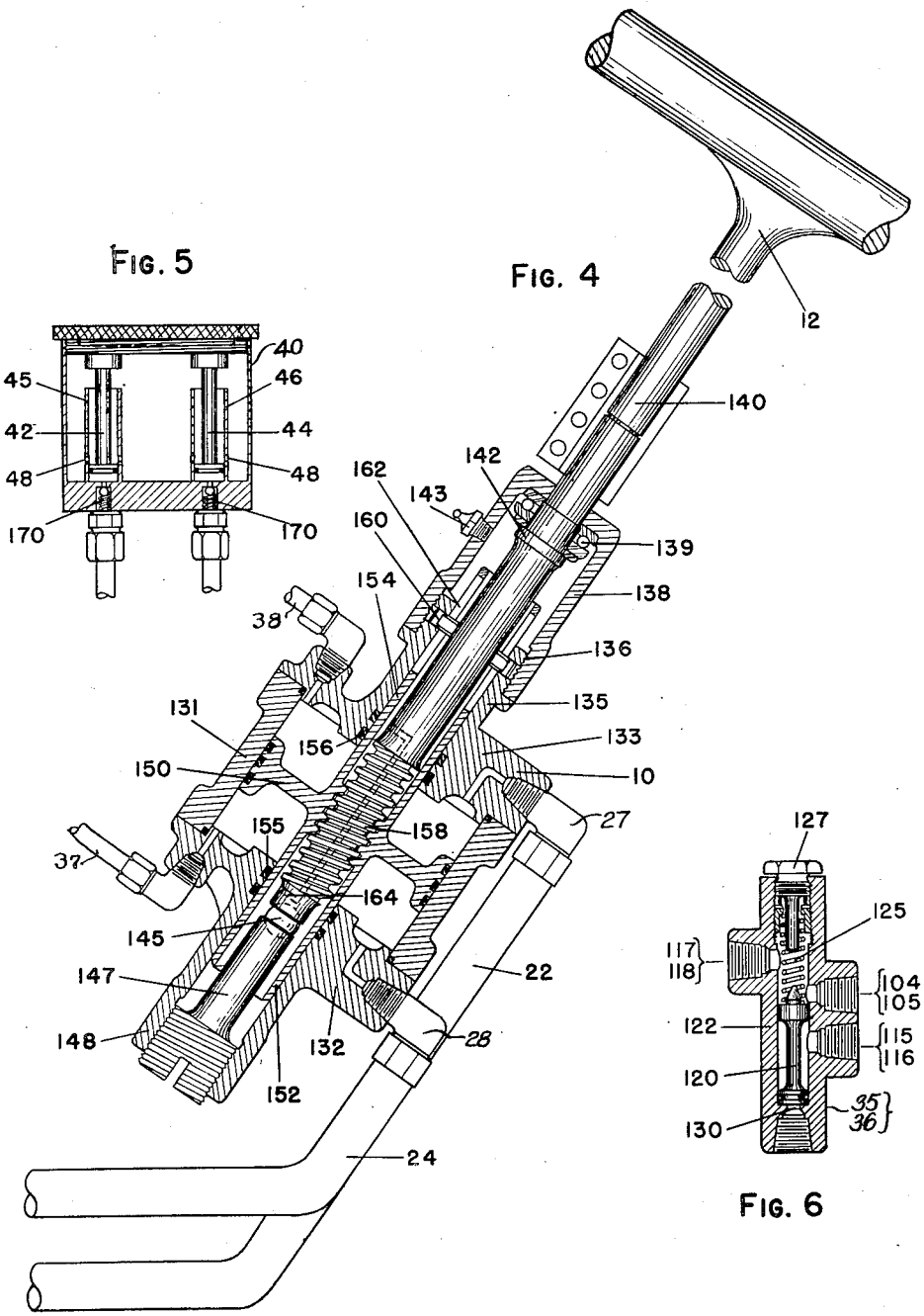
INVENTOR
GORDON W. HARDY
BY
George M. Soule
ATTORNEY Patented Jan. 23, 1951

2,539,018

UNITED STATES PATENT OFFICE 2,539,018

HYDRAULIC STEERING MECHANISM

Gordon W. Hardy, Euclid, Ohio

Application January 6, 1945, Serial No. 571,571

3 Claims. (Cl. 60—52)

The present invention relates to a fluid actuated mechanism to shift a member with respect to its supporting frame and more particularly to a steering mechanism in which the member is a vehicle wheel mounted to be shifted or turned on its supporting axle.

As the size of vehicles has increased their wheels and the loads placed on them have also increased to a point where it is necessary to provide means to increase the turning force which can be applied by the human operators to turn the wheels. Such mechanisms are not broadly new but have heretofore been subject to certain disadvantages and open to improvement. One form of such mechanism has employed two piston-cylinder units, one at the wheel and one at the steering position, to transmit the turning force by fluid pressure to the former from the latter. This invention is concerned with an improved type of such gear.

The general object of the present invention has been to provide an improved steering mechanism employing a fluid operated servo system to receive the turning thrust from the operator, multiply it and then transmit it to the wheel or wheels to be turned. A further object of the invention has been to provide such a mechanism in which the wheel, after turning, may be returned to its original position by reversing the action of the system. Still another object of the invention has been to provide means for applying the turning force to the wheel in a plurality of increments by employing a servo system at the time turning is begun and, if the wheels' resistance is too great, automatically applying the force of a booster system to supplement the servo system. A still further object of the invention has been to provide a servo cylinder and piston unit and a booster cylinder and piston unit mounted adjacent the vehicle axle and preferably in alignment therewith and connected with the wheels to turn them as force is applied from the steering wheel. An additional object has been to provide a more positive, less expensive and more simple construction than heretofore has been available.

Other objects of the invention will become apparent from study of the specification and the attached drawings in which:

Fig. 4 is a cross section of the master cylinder unit;

Fig. 5 is a cross section through the master cylinder replenishing pump; and,

Fig. 6 is a section through a booster operating valve.

Referring generally to parts which later will be described in detail the mechanism consists of two cylinder and piston units, a master unit at the steering wheel and a servo unit, supplemented by a booster unit, at the axle of the wheels to be turned. Fluid lines connect each end of the master cylinder with each end respectively of the servo unit cylinder. Fluid, preferably oil, fills the chambers formed in the two cylinders by the pistons and also the connecting lines.

Rotation of the steering wheel shifts the master cylinder and piston with respect to each other to increase the fluid pressure in one chamber and decrease it in the other, thus effecting a pressure differential between opposite sides of the master piston. This differential is transmitted through the lines to the servo cylinder to shift the piston in it. Since this latter piston is connected to the vehicle wheel, the wheel is turned. When the master piston is returned to its initial position the wheel is likewise returned. No fluid is expended from the system during an operating cycle.

If the resistance to turning offered by the wheel is too great and exceeds a predetermined amount the pressure in the line connected with the chamber subject to pressure rise will increase until it is high enough to open a spring loaded valve. This valve normally closes a line between a source of fluid under pressure, air or oil, and the cylinder of a booster unit consisting of a cylinder and piston. The booster piston is thus moved and as it too is connected to the wheel it supplements the servo unit in shifting it to the desired angle to the vehicle axle.

The booster unit may comprise one piston with two piston rods, one connected to each wheel; or two pistons with each piston connected to only one wheel. In either case the attainment of a predetermined pressure in one master cylinder fluid line will actuate booster action in one direction while the attainment of a predetermined pressure in the other master cylinder line will actuate the booster in the opposite sense. If oil is used to actuate the booster it may be supplied at the desired pressure by a pump and after use returned through an oil sump. If air is used it may be supplied by an air storage tank or accumulator and after use exhausted to the atmosphere.

Figure 1:
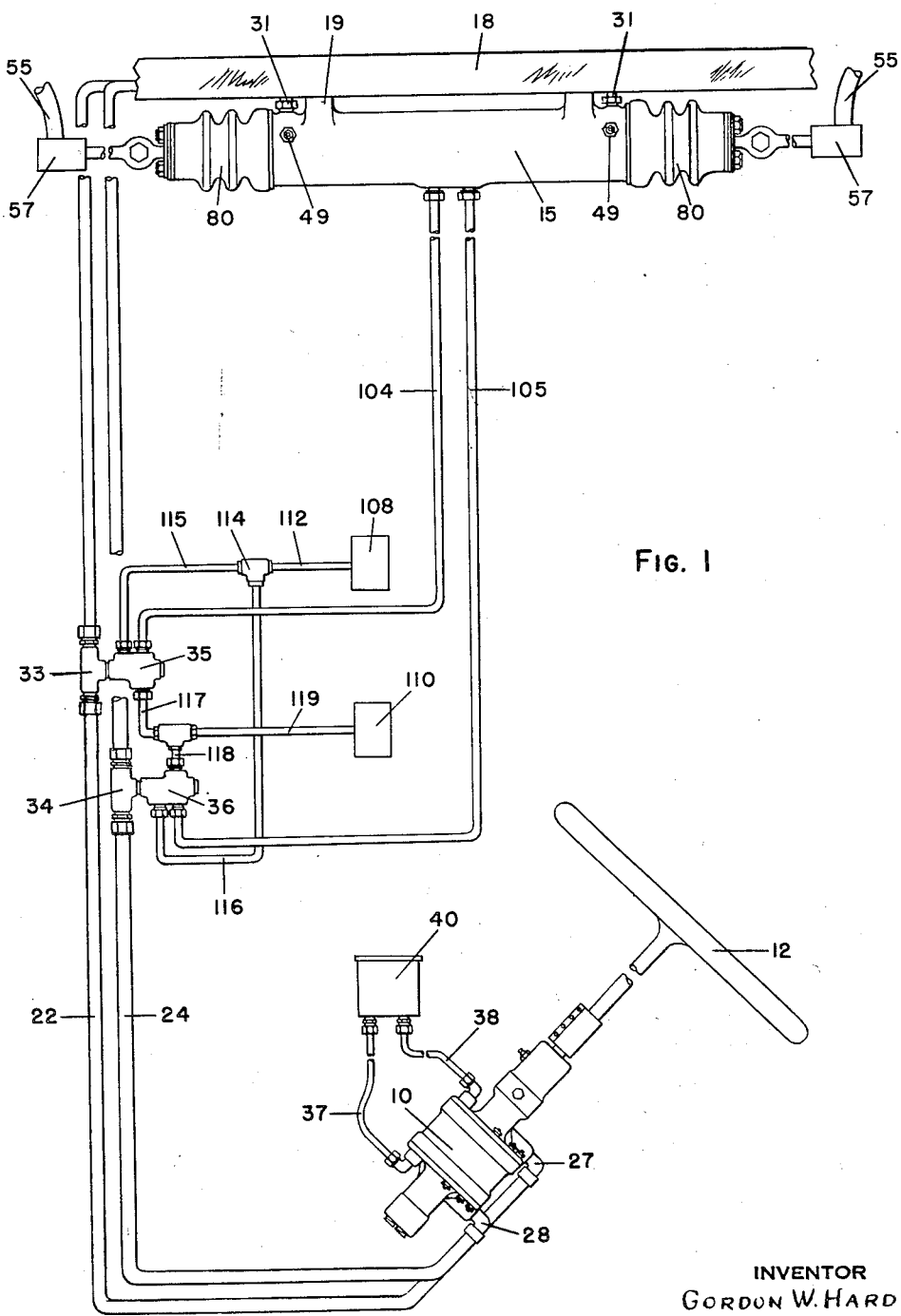
Fig. 1 is a schematic layout of the entire mechanism of the invention.

The general description given above will now be amplified by reference to the drawings, particularly Fig. 1. In that figure the master cylinder is indicated at 10 and is operatively connected to a steering wheel 12 rotatably mounted on the vehicle frame. Rotation of the wheel operates mechanism hereafter described to shift the piston carried in the master cylinder.

Figure 2:
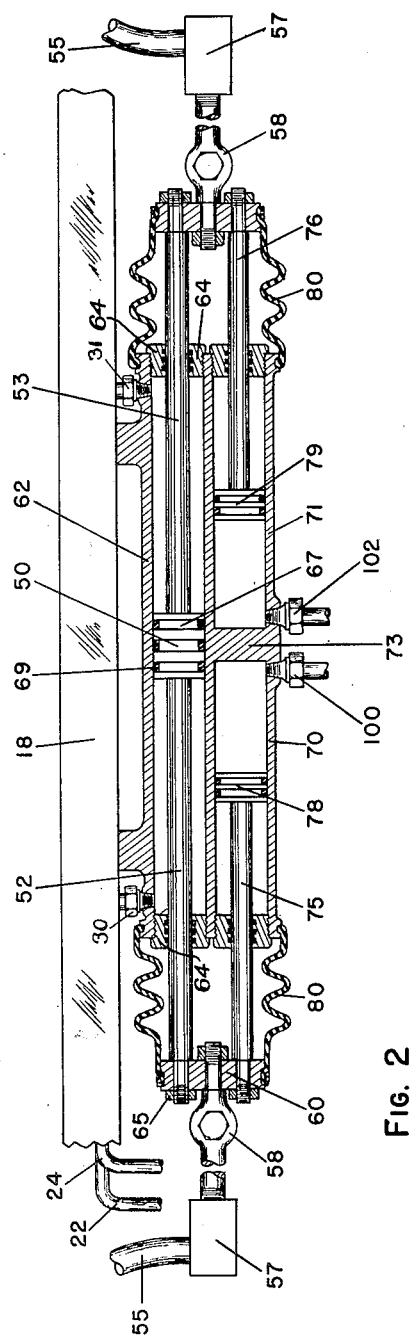
Figs. 2 and 3 are alternate forms of servo and booster cylinder units.
Figure 3:
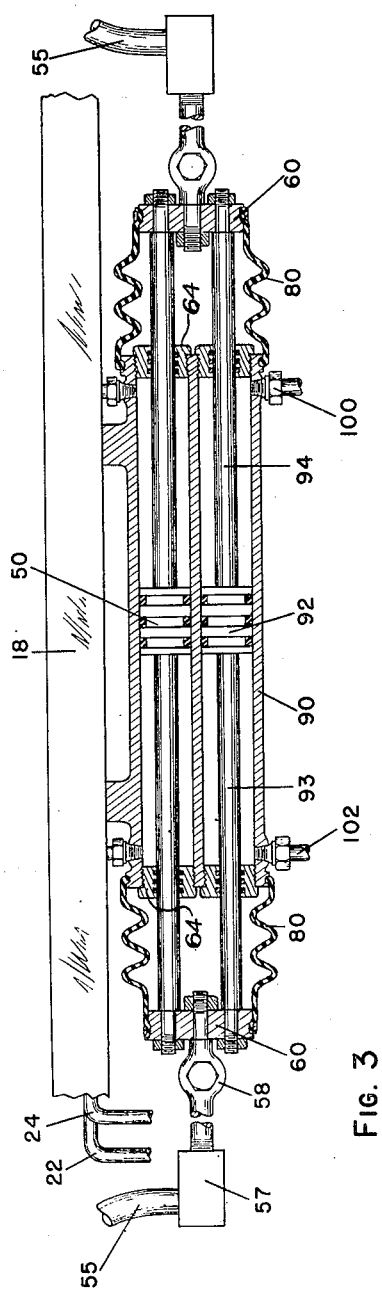

Remote from the steering wheel is a cylinder block 15 secured by bolts to the vehicle front axle 16. This is a channel shaped member and the block 15 is provided with bosses 19 bearing against the web of the channel. This cylinder block is formed to provide cylinders for the servo and booster pistons. The cylinders may be arranged as shown in Fig. 2 or Fig. 3 or the cylinders may be separated the one from the other, although they should preferably be maintained parallel with the axis of their supporting axle. The block 15 may be formed in any desired manner although preferably this will be a casting.

Fluid supply lines 22 and 24 connect with opposite ends of the master cylinder 10 at 27 and 28 and with opposite ends of the servo cylinder at 30 and 31 respectively. Provision is made through T's 33 and 34 in lines 22 and 24 to actuate valves 35 and 36 controlling the booster operation in a manner hereafter to be described.

To fill the master cylinder, the servo cylinder and their connecting lines; oil is forced into the ends of the master cylinder through lines 37 and 38. The lines may be supplied by a combination of a filling tank or pump 40 (Fig. 5) and two manually operated piston pumps 42 and 44 operating in cylinders 45 and 46 and receiving oil through ports 48 from the tank 40 in which the cylinders are located. Alternatively the master cylinder 10 may be supplied through lines 37 and 38 from an oil line supplying oil at a pressure of approximately 40 pounds per square inch gauge. This oil may be supplied from the vehicle lubricating system. To permit release of air from the system when it is filled vents 49 in the block leading to the servo cylinder are removed and later replaced.

As the master piston is shifted in its cylinder 10 the pressure on one side of the servo piston 50 (Fig. 2) will be increased and on the other side decreased. The servo piston will move in the direction of least pressure and through its piston rods 52 and 53 pull on one wheel and push on the other to turn them. Connection to each wheel from a respective servo piston rod is made through a knuckle 55, universal connection 57 and tie rod 58 to a cross arm 60, all shown diagrammatically. The piston rods are secured to respective cross arms.

The details of construction of the servo and booster piston and cylinders are shown in Figs. 2 and 3. The block 15 is shown in Fig. 2 to consist of three cylinders. The servo cylinder, indicated at 62, extends from end to end and is closed by threaded caps 64 bored to receive piston rods 52 and 53. The outer ends of the piston rods are formed with a shoulder and a threaded portion of reduced diameter. This portion passes through a hole in cross arm 60 and the shoulder is drawn tightly against the tie rod by bolts 65.

Oil for shifting the piston 50 is admitted at the ends of the servo cylinder through fittings 30 and 31 communicating with lines 22 and 24 respectively (Fig. 1). To prevent leakage of oil from one side of the piston 50 to the other a plurality of annular recesses 67 are cut therein to receive a synthetic rubber ring and form a linear seal between the piston and the cylinder sidewall. These rings are indicated at 69 and are incorrectly shown as sectioned to emphasize their position. Similar seals are formed in the end caps 64 to prevent leakage where the piston rods pass through them.

Two aligned booster cylinders 70 and 71 are formed in the block 15 in the construction of Fig. 2. They are parallel with the servo cylinder 62 and are separated from each other by a cylinder end wall 73. These cylinders also are closed with end caps 64 bored to receive piston rods 75 and 76 secured to pistons 78 and 79 respectively. The other ends of the piston rods are secured to respective cross arms 60 in the same manner as are servo piston rods 52 and 53. To protect the extended ends of the piston rods a corrugated boot 80 is provided at each end of block 15 to form a resilient covering extending between that end and the adjacent cross arm.

The construction of Fig. 3, which has the advantage of being shorter than that of Fig. 2 in comparable installations, employs a single booster cylinder like its associated servo cylinder. The cylinder indicated at 90 carries a single piston 92 provided with opposed piston rods 93 and 94 connected through end caps 64 to respective cross arms 60. In all other respects than those mentioned above this alternative construction is like that shown in Fig. 2.

Fluid to actuate the booster pistons is supplied to the cylinders through fittings 100 and 102 to which are connected lines 104 and 105. These lines lead to valves 35 and 36 respectively. The construction of these values is shown in cross section in Fig. 6. Two other lines enter each valve; one from an oil pump or air storage tank, depending on whether liquid or gas is used to shift the booster piston. Another line leads from each valve to an oil sump or exhaust to atmosphere, again depending on what fluid is used. The pump or tank is indicated at 108 and the sump or exhaust at 110.

A line 112 passes from supply unit 108 to a T 114 where it divides into lines 115 and 116 leading to valves 35 and 36 respectively. In like manner lines 117 and 118 exhaust from valves 35 and 36 to a common line 119 leading to 110.

Each valve (Fig. 6) is provided with a "dumbbell" piston 120 each end of which is closely fitted to cylinder sidewall 122 to provide a fluid-tight seal therewith. The piston is normally held in the exhaust position (lines 104 and 117 or 105 and 118 in communication) by a calibrated spring 125. The force this spring exerts on the piston 120 is governed by an adjustment 127 threaded into the valve case.

To enable a predetermined pressure in line 22 or 24 to actuate valve 35 or 36 a short line leads from T 33 or 34 to communicate with a calibrated orifice 130 in the valve case (Fig. 6). When this predetermined pressure is reached in either line the resistance of spring 125 in the associated valve is overcome and piston 120 is moved up to place lines 115 and 104 or 116 and 105, as the case may be, in communication.

This permits fluid under pressure to flow through the indicated fitting 100 or 102 and actuate the booster mechanism to supplement the thrust of the servo system. If the construction of Fig. 2 is employed either piston 78 or 79 will act through piston rod 75 or 76 to push on the same tie rod against which the force of the servo piston 50 is already being exerted. In like manner, if the construction of Fig. 3 is used the piston 92 will exert its force in the same direction as servo piston 50. In this connection it should be noted that the relative positions of fittings 100 and 102 are reversed in Fig. 3 as compared with Fig. 2.

The fact that the booster mechanism is operating in one direction as by admission of fluid at 100 requires that fluid simultaneously be exhausted from the block at 102 due to the motion of the steering gear. This is possible because if valve 35 is positioned to admit fluid to the block at 100 the valve 36 connected to fitting 102 remains in the exhaust position. This is due to the fact that as pressure is built up in one line 22 or 24 it is relieved in the other and thus the latter's associated valve remains at exhaust due to spring 125.

Reference should be made to the construction of master cylinder 10 and its components to see how pressure is simultaneously built up in one of lines 22 or 24 and relieved in the other, accompanied by displacement of oil in the servo system itself.

This master cylinder comprises a cylindrical portion 131 to which are secured by suitable bolts, end caps 132 and 133. The cap 133 is provided with an axial extension 135 of reduced diameter terminating in an external thread 136. An internally threaded cover 138 is secured to threads 136 and carries one race of a ball thrust bearing 139. The other race is carried by the steering column 140 and bears against a thrust collar 142 thereon. Lubricant may be supplied to said cover through an opening normally closed by a grease plug 143.

Thrust at the end of the steering column is received by a single ball thrust bearing consisting of a ball 145 received in a semi-spherical socket at the end of the column and one in the end of a plug 147. This plug is threadingly received in the bore of a hollow extension 148 of the end cap 132. The tightness of the column between the two thrust bearings may be regulated by rotation of the plug 147.

A master cylinder piston 150 is mounted for reciprocation but restrained against turning in the master cylinder. This piston is provided with two hollow extensions 152 and 154 which are formed to have a sliding fit with the inside of caps 132 and 133. Linear seals 155 and 156 insure that there shall be no leakage of oil from the master cylinder to the steering column. Similar seals are provided between the piston and cylinder sidewall.

The piston is reciprocated in the cylinder by rotation of the steering column 140. To this end the column is threaded as at 158 to engage a complementary thread in the piston 150. Also, the piston is restrained against rotation by two or more keys 160 carried in the extension 135 and riding in slotted keyways 162 in the piston extension 154. The keys are kept in locking relation to the extensions 135 and 154 by the steering post but do not pass through or into the post. Thus as the steering wheel is turned, the piston will be moved in one or the other direction in its cylinder. A passage 164 in the column 140 permits flow of lubricant from one side of the piston thread to the other and prevents any locking of the piston by entrapment of steering column lubricant.

Movement of the piston in one direction increases the pressure on the oil in one piston-cylinder chamber and relieves it in the other. If the pressure on the oil in the upper chamber (Fig. 4) is increased it will force oil through line 22 to operate the servo piston and turn the wheels. At the same time the movement of the piston upwardly will increase the volume of the lower chamber and permit, in fact assist by suction, transfer of oil from the servo cylinder fed by line 24 back into the chamber. Movement of piston 150 in the opposite direction will transfer oil out of the lower chamber and draw it into the upper chamber to move the wheels in the opposite direction.

The operation of the booster system also is controlled by movement of piston 150. As it builds up pressure in either line 22 or 24 to a predetermined value against the resistance to turning offered by the road wheels either valve 35 or 36 will be operated to permit the corresponding booster to supplement the servo piston. The turning force on the road wheels by the booster continues only so long as the driver continues to exert sufficient force on the steering wheel to cause pressure in the line 22 or 24 to move the valve 120 against the valve return spring 125 sufficient to maintain the lines 104 and 115 or 105 and 116 in communication. Thus the angle of turning of the road wheels is determined primarily or is always fully controlled by the amount the steering wheel is turned manually. Thus the booster can never overrun the turning effect on the road wheels by the steering wheel and can never come into play until steering requires more than a certain determinable application of force.

It will be seen that no oil is expended in the servo system as the master piston is operated. Oil is merely transferred to or from the servo and master cylinders.

From time to time it is necessary, due to leakage, to replenish some of the oil in the system. This is done by removing the cover to the pump 40 and manually operating the piston 42 and 44. Flow of oil back to the pump is prevented by check valves 170 (Fig. 5). If the vehicle lube system is used its pressure will force oil into the cylinder 10 to charge the servo system. As heretofore stated, the vents 49 in the servo cylinder should first be opened to release air trapped in the system.

From the foregoing description it will be seen that I have provided a novel steering mechanism comprising a servo system and a booster system. Both are controlled from the steering wheel. The servo system is operated by rotation of the steering wheel and the booster system, already conditioned for use, is set in operation when rotation of the steering wheel results in abnormal pressure in either line 22 or 24.

I claim:

1. In a fluid actuated device, a fluid pressure means, a fluid conductor tube communicating therewith, an actuated piston, an enclosed cylinder for said actuated piston with which said fluid conductor communicates, a booster piston connected with said actuated piston, an enclosed cylinder confining said booster piston, a second fluid pressure means, a valve device having an inlet port, an exhaust port, a movable valve element, and a pair of ports controlled by said valve element, one of said pair of ports being, in normal position of said valve element, open to said exhaust port, means connecting said fluid conductor tube with the inlet port of said valve device, said one of the pair of ports communicating with said booster piston and the other of said pair of ports communicating with said second-mentioned fluid pressure means, said valve element, at a predetermined pressure within said fluid conductor tube, adapted to be moved to close the one of said pair of ports from the exhaust port and to connect the pair of ports together, whereby the second fluid pressure supply communicates with said booster piston to actuate the same.

2. In a fluid actuated device, a fluid pressure means, a fluid conductor tube communicating therewith, an actuated piston, an enclosed cylinder for said actuated piston with which said fluid conductor communicates, a booster piston connected with said actuated piston, an enclosed cylinder confining said booster piston, a second fluid pressure means, a valve device having an inlet port, an exhaust port, a movable valve element, and a pair of ports controlled by said valve element, one of said pair of ports being, in normal position of said valve element, open to said exhaust port, means connecting said fluid conductor tube with the inlet port of said valve device, said one of the pair of ports communicating with said booster piston and the other of said pair of ports communicating with said second-mentioned fluid pressure means, said valve element, at a predetermined pressure within said fluid conductor tube, adapted to be moved to close the one of said pair of ports from the exhaust port and to connect the pair of ports together, whereby the second fluid pressure supply communicates with said booster piston to actuate the same, said valve device including a spring tending to hold said valve element in said normal position against pressure in said fluid conductor tube.

3. In a fluid actuated device, a fluid pressure means, a fluid conductor tube communicating therewith, an actuated piston, an enclosed cylinder for said actuated piston with which said fluid conductor communicates, a booster piston connected with said actuated piston, an enclosed cylinder confining said booster piston, a second fluid pressure means, a valve device having an inlet port, an exhaust port, a movable valve element, and a pair of ports controlled by said valve element, one of said pair of ports being, in normal position of said valve element, open to said exhaust port, means connecting said fluid conductor tube with the inlet port of said valve device, said one of the pair of ports communicating with said booster piston and the other of said pair of ports communicating with said second-mentioned fluid pressure means, said valve element, at a predetermined pressure within said fluid conductor tube, adapted to be moved to close the one of said pair of ports from the exhaust port and to connect the pair of ports together, whereby the second fluid pressure supply communicates with said booster piston to actuate the same, said exhaust port having a tube connected therewith and a sump into which said tube extends.

GORDON W. HARDY.

REFERENCES CITED

The following references are of record in the file of this patent:

UNITED STATES PATENTS

| Number | Name | Date |
| --- | --- | --- |
| 962,257 | Rockwell | June 21, 1910 |
| 1,375,678 | Crum | Apr. 26, 1921 |
| 1,790,620 | Davis | Jan. 27, 1931 |
| 1,806,136 | Weiss | May 19, 1931 |
| 1,894,055 | Perkins | Jan. 10, 1933 |
| 1,899,814 | Lewis | Feb. 28, 1933 |
| 2,152,021 | Baumer | Mar. 28, 1939 |
| 2,187,073 | Hardy | Oct. 31, 1939 |
| 2,360,539 | Ballard | Oct. 17, 1944 |

FOREIGN PATENTS

| Number | Country | Date |
| --- | --- | --- |
| 484,919 | Great Britain | May 11, 1938 |
| 702,983 | Germany | Feb. 25, 1941 |